(12) United States Patent  (10) Patent No.: US 7,532,754 B2
Fujino  (45) Date of Patent: May 12, 2009

(54) IMAGE PROCESSING APPARATUS AND PRINT CONTROL APPARATUS

(75) Inventor: Makoto Fujino, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 677 days.

(21) Appl. No.: 11/313,911

(22) Filed: Dec. 22, 2005

(65) Prior Publication Data
US 2006/0165281 A1   Jul. 27, 2006

(30) Foreign Application Priority Data
Dec. 24, 2004  (JP) .............................. 2004-372722
May 19, 2005  (JP) .............................. 2005-146697

(51) Int. Cl.
*G06K 9/00*  (2006.01)
(52) U.S. Cl. ........................................ 382/167; 382/274
(58) Field of Classification Search ................ 382/167, 382/274; 358/1.9, 3.24, 3.26, 518, 521
See application file for complete search history.

(56) References Cited

U.S. PATENT DOCUMENTS

| 5,606,432 A | 2/1997 | Ohtsuka et al. |
| 5,696,840 A | 12/1997 | Usami |
| 6,822,758 B1 | 11/2004 | Morino |
| 7,215,825 B2 * | 5/2007 | Sugimoto et al. ............ 382/274 |
| 7,289,664 B2 * | 10/2007 | Enomoto .................... 382/167 |
| 2005/0231605 A1 | 10/2005 | Nakami et al. |

FOREIGN PATENT DOCUMENTS

| JP | 02-288697 A | 11/1990 |
| JP | 07-231393 A | 8/1995 |
| JP | 08-289153 A | 11/1996 |
| JP | 2000-020691 A | 1/2000 |
| JP | 2001-167260 A | 6/2001 |
| JP | 2002-314809 A | 10/2002 |
| WO | WO 2004-008754 A1 | 1/2004 |

* cited by examiner

*Primary Examiner*—Phuoc Tran
(74) *Attorney, Agent, or Firm*—Sughrue Mion, PLLC

(57) ABSTRACT

In the conventional technologies, it was difficult to automatically improve the quality of an image to an appropriate level that was unable to be appropriately improved during the process of producing image data in an image capturing device. According to the present invention, in order to correct the quality of an image, image data produced by an image capturing device is obtained, a conversion processing is performed that is equivalent to the reverse processing of a color adjustment processing performed by the image capturing device to produce the image data, and image quality adjusted data is produced, based on the image data, that represents an image obtained when an image quality adjustment processing was performed on the data after the conversion processing.

13 Claims, 9 Drawing Sheets

IMAGE PROCESSING APPARATUS AND PRINT CONTROL APPARATUS

BACKGROUND OF THE INVENTION

1. Field of the Invention

The present invention relates to an image processing apparatus and a print control apparatus.

2. Description of the Prior Art

In recent years, image input devices such as digital cameras are spreading rapidly, and image data produced by image input devices are more and more used. This image data is, for example, data that represent the gradation of colors for each color component of three colors, RGB (red, green, and blue), and can be readily processed. This allows automatic image quality adjustment when utilizing image data, as in printing (refer to Japanese Patent Laid-open No. 2002-314809, for example).

With the prior arts, it was difficult to automatically improve mage quality to an appropriate level, for an image whose image quality could not be appropriately improved during the process of producing image data in the image input device. For example, it was difficult to appropriately perform an exposure correction to compensate for excessive or deficient exposure in producing image data, and color balance correction, such as white balance adjustment, to correct unbalanced colors. Particularly, it was impossible to achieve desired correction only by constant multiplication of the amount of light to correct inappropriate color balance or exposure, or constant multiplication of the gradation value for each color, which made it difficult to perform appropriate correction automatically or manually. Furthermore, although nonlinear correction such as the γ correction can be performed as well as multiplying the gradation value, it was difficult to automatically or manually determine an appropriate nonlinear characteristic even in the nonlinear correction.

SUMMARY OF THE INVENTION

The present invention has been made in view of the problems described above, and therefore an object of the invention is to provide an image processing apparatus, image processing method, image processing program, print control apparatus, print control method, and print control program that enable automatic and appropriate improvement of the image data which could not be appropriately improved during the process of producing image data in an image capturing device.

In order to achieve the above object, the present invention deals with a conversion processing which is the reverse of a color adjustment processing performed by an image input device to produce the image data. That is, even if the sensor of an image capturing device such as a digital camera captured a signal that is approximately proportional to the amount of light, the image input device typically performs a color adjustment processing. For example, since a color tone variation that appears smooth to human eyes is not a variation proportional to the amount of light, a conversion to conform to the image data standard (such as sRGB) and/or a processing to enhance the image impression (such as contrast emphasizing) are performed.

In such a processing, however, the gradation value of each color component of image data does not, in general, result in a signal that is approximately proportional to the amount of light. Therefore, even if the exposure and color balance are physical quantities that can be adjusted by constant-multiplying the amount of light, appropriate correction will not be achieved by such an adjustment, i.e., constant-multiplying the gradation value of image data. In contrast, the present invention assumes a conversion processing that is the reverse of the color adjustment processing including the various processing described above, and obtains image quality adjusted data that represent an image that has gone through an image quality adjustment processing. This makes it possible to perform an appropriate image correction processing by means of an extremely simple image quality adjustment processing such as the constant multiplication of gradation value, and thereby to automatically and appropriately improve the image that could not be appropriately transformed at the process of producing image data in an image capturing device.

Here, the image data is image data that has been produced by an image capturing device, and may be any image data on which a predetermined color adjustment processing has been done by the image capturing device, and there is no particular limitation to the color component and the number of colors. For example, for a monochrome image, the image data may be one color component (such as brightness), and for a color image, it may be the data in which gradation is specified for each color component of three colors (RGB, YCbCr, etc.). However, since the image data is assumed to be the image data resulting from the color adjustment processing that has been done on a signal, which is proportional to the amount of light, obtained by an image capturing device, raw data and the like on which the color adjustment processing has not been performed are not included in the image data. Note that the amount of light herein means the amount of light to be used for forming an image, and is determined by the luminance and exposure time per unit area.

The color adjustment processing may be a combination of a plurality of processing including all the image processing to be performed by an image capturing device to produce image data, or may be one processing. Either way, any processing opposite to this processing that can be defined as the conversion processing described above serves the purpose. Although it is desirable for defining the reverse processing to define a function or the like that specifies the conversion characteristic of a gradation value, it is also possible to define the conversion processing with the table data that defines only the conversion characteristic of a typical gradation value.

The image correction unit may be such a means that allows generation of image quality adjusted data representing an image on which an image quality adjustment processing has been done after performing this conversion processing on image data. Also, it is possible to calculate a conversion characteristic when the conversion processing and image quality adjustment processing are performed on image data, and obtain the image quality adjusted data based on this conversion characteristic. In addition to these embodiments, other various embodiments may be employed.

Noting the linearity of image data, such an embodiment is also possible that automatically improve the image represented by image data to an appropriated level. That is, a conversion processing is considered whereby image data is converted such that the gradation value varies linearly with the amount of light. According to this conversion processing, even if the gradation value of each color component of the image data is not data that does not vary linearly (proportionally) with the amount of light, it is possible to convert the image data into data that varies linearly with the amount of light.

Consequently, it becomes possible to perform an appropriate image correction processing by performing a very simple image quality adjustment processing, such as the constant-multiplication of a gradation value, on the converted data. This makes is possible to automatically improve an image to an appropriate level, even for an image that could not be improved to an appropriated image during the process of producing image data in an image capturing device. Here, the image data may be such image data that represents an image with the gradation value varying nonlinearly with the amount of light, and there is no particular limitation to the color component and the number of colors. For example, for a monochrome image, the image data may be one color component (such as brightness), and for a color image, it may be the data in which gradation is specified for each color component of three colors (RGB, YCbCr, etc.). However, since an image is represented with the gradation value that varies nonlinearly with the amount of light, raw data and the like whose signal intensity varies approximately nonlinearly with the amount of light is not included in the image data of the present invention.

Also, the conversion processing may be a processing capable of converting image data such that the gradation value varies linearly with the amount of light, and therefore various embodiments are possible. For example, if image data is produced by converting a signal that varies linearly with the amount of light, a reverse conversion may be used for the conversion processing of the present invention. Although it is desirable for defining the reverse processing to define a function or the like that defines the conversion characteristic of a gradation value, it is also possible to define the conversion processing with the table data that defines only the conversion characteristic of a typical gradation value.

For the image correction unit, it is enough to allow generation of image quality adjusted data representing an image on which an image quality adjustment processing has been done after performing this conversion processing on image data. Also, it is possible to calculate a conversion characteristic when the conversion processing and image quality adjustment processing are performed on image data, and obtain the image quality adjusted data based on this conversion characteristic. In addition to these embodiments, other various embodiments can be employed.

Since the present invention assumes the data which has gone through the conversion processing opposite to the color adjustment processing and/or the conversion processing that changes the linearity of the gradation value, as described above, it is possible to obtain image quality adjusted data only by performing a very simple image quality adjustment processing with an image correction unit. Therefore, either or both of the simple exposure correction and the color balance correction can be employed.

In other words, by employing a processing for constant-multiplying the brightness of an image, for example, a processing for constant-multiplying the gradation value indicating a luminance component of the image, in the data on which the aforementioned conversion processing has been done, exposure correction can be achieved by a very simple processing. That is, excessive or deficient exposure is evaluated based on the intensity of light captured by the sensor of an image capturing device, and is typically defined by the rate of change in the amount of light (Exposure Value (EV) or the like) relative to a reference exposure. Accordingly, appropriate exposure correction can be achieved by multiplying the data to which the conversion processing has been applied, by a constant calculated from the rate of change.

Furthermore, employing a processing for constant-multiplying each chromatic color component with a different constant allows color balance correction to be made by a very simple processing. That is, when the amount of light is compared to a reference amount of light for each chromatic color of an image with particular colors, if the amount of light of a particular color component increases or decrease as compared with the reference amount of light, color balance deterioration will result. This deterioration can be evaluated based on the relative sensitivity of the sensor of an image capturing device for each chromatic color component, if the sensor can capture a signal that is proportional to the amount of light. Therefore, constant-multiplying the data in a particular chromatic color component after the conversion processing will result in the relative sensitivity being adjusted, making color balance correction easy.

Since an image capturing device such as a digital camera performs its own color adjustment processing to produce image data, and consequently automatic image adjustment becomes difficult, the present invention introduces the aforementioned conversion processing so that easy and appropriate correction can be achieved even if such a color adjustment processing is performed. That is, the color adjustment processing of an image capturing device is designed by its manufacturer, and generally the details of the processing are not disclosed. Therefore, different image capturing devices may employ different processing, and for performing a reverse processing of the color adjustment processing, it is common to consider it necessary to introduce different reverse processing for different image capturing devices.

However, according to an analysis by the applicant of the present invention, it was found that the color adjustment processing designed by many manufacturers of the image capturing device can be described with almost the same characteristic. Accordingly, if a conversion processing is introduced that is equivalent to the reverse conversion of the color adjustment processing and does not depend on any manufacturer of the image capturing device, it is possible to implement the invention so that the image data produced by different image capturing devices of many manufacturers can be appropriately processed.

More specifically, it was found that the color adjustment processing of the image capturing device consists of a combination of a color adjustment processing for converting the color specification system for a gradation value and a processing for improving the appearance of an image. The former is almost common to the image capturing devices of all the manufacturers, and there is little room for a manufacturer to introduce its own concept. On the other hand, the improvement of image appearance as achieved by the latter processing may depend on subjective elements and therefore differences may be allowed between manufacturers, but practically most of the manufacturers have employed similar contrast adjustment processing.

That is, if the contrast emphasizing processing of many manufacturers is described by the processing in which a gradation value equivalent to the brightness of each color component is used as an input value and the input value is converted to an output value according to a predetermined input/output characteristic, this input/output characteristic can be described by a gradual S-shaped curve in a graph where the horizontal axis is input values and the vertical axis is output values. Also, it was found that the rate of change at an approximate median of input values is 1.1 to 1.4, and the rate of change for a predetermined input value equivalent to flesh color is 1. Note that the rate of change of the input/output is represented by the inclination of the curve in the graph.

That is, as the input value increased from zero, the rate of change of the input/output gradually increased from 1 or less, then exceeded 1 before reaching an approximate median of the input values, and was around 1.1 to 1.4 at the approximate median of the input values. Then, the rate of change gradually decreased starting from a certain input value, and became 1 at the input value for flesh color, and further decreased as the input value increased. Therefore, in the aforementioned input/output characteristic, if the rate of change at the approximate median of input values is assumed to be 1.1 to 1.4 and that of the input/output at a predetermined input value equivalent to flesh color to be 1, then it is possible to define an input/output characteristic having almost the same nature as the color adjustment processing of many manufacturers.

Accordingly, performing, on this input/output characteristic, a combination of color adjustment processing for converting the color specification system for the gradation value, as needed, makes it possible to define the conversion processing, and thereby to perform an appropriate image correction by means of a simple image processing as described herein. The approximate median of input values may be an approximate median of a range of input values, for example, equivalent to an input value for a color whose luminance (L*) is 40 to 60. Also, the predetermined input value equivalent to flesh color may be a range of values in which the input value for a color that can be classified as a flesh color, for example, equivalent to an input value whose luminance (L*) is 60 to 75.

As described above, for the image correction unit, it is enough to be able to produce image quality adjusted data representing an image when the image quality adjustment processing has been performed on image data after performing the conversion processing, and an embodiment that utilizes conversion characteristic data representing the conversion processing may be employed as an embodiment for producing image quality adjustment data. For example, the conversion characteristic data is pre-stored on a predetermined medium.

For the image correction unit, it is enough to obtain image quality adjusted data representing an image obtained when the image quality adjustment processing has been done after converting the image data based on the conversion characteristic data. Of course, a conversion processing and an image adjustment processing actually based on conversion characteristic data may be performed here. It is also possible to calculate a conversion characteristic when the conversion processing and image quality adjustment processing have been performed on image data, and obtain image quality adjusted data based on the obtained conversion characteristic. Other various embodiments may also be possible.

The image adjusted data may be data when a conversion was performed with a reverse characteristic of that of the conversion processing after performing the image quality adjustment processing including exposure correction and color balance correction. As a preferable embodiment for producing this data, such an embodiment may be possible that defines the image quality adjustment characteristic data representing a conversion characteristic that can be obtained by performing a combination of the conversion processing represented by the conversion characteristic data, the image quality adjustment processing, and the reverse conversion of the conversion processing.

That is, defining the image quality adjustment characteristic data makes it possible to readily obtain the image quality adjusted data by converting the image data with reference to the image quality adjustment characteristic data. Here again, the image quality adjustment characteristic data may be produced by actually performing the conversion processing and image quality adjustment processing based on the image data, or profile data equivalent to the image quality adjustment characteristic data may be prepared in advance according to the amount of correction (such as the amount of exposure correction and a constant to be multiplied for color balance correction).

Furthermore, if the conversion characteristic data representing the characteristic of the conversion processing is included in image data it is possible to perform a correction with the image correction unit by referring to the image data. Various embodiments may be employed as an embodiment for including the conversion characteristic data in image data. For example, it is possible to compose the image data of actual data representing an image and tag data representing other than an image, and to describe conversion characteristic data in the tag data. Such data include the image data conforming to the standards such as Print Image Matching (PIM, a registered trademark of Seiko Epson Corporation) and Exit Print (Exif, a registered trademark of Electronic Information Technology Industry Association).

If the above embodiment is employed, the image capturing device manufacturers producing image data will be able to define the conversion characteristic data, and therefore it is possible to produce conversion characteristic data accurately reflecting the color adjustment processing. This enables the image quality adjustment processing to be performed without the influence of the conversion processing by the image correction unit, thus making it possible to perform a more appropriate and reliable image quality adjustment processing.

Also, it is possible to obtain image quality adjusted data when an image quality adjustment processing for obtaining a higher image quality image was performed. Various embodiments may be employed for this purpose, and if incomplete gradation occurs during image quality adjustment, the image quality adjusted data may be produced by performing the image quality adjustment processing so as to suppress the incomplete gradation. That is, in image data, the color of a pixel is typically represented by identifying the gradation value of each color component, the range of gradation being definite.

Accordingly, if the gradation value is changed based on a certain characteristic by the image quality adjustment processing, the changed gradation value is biased to a certain gradation value (e.g. a maximum value of gradation), and as a result, the gradation of an image may be impaired. Therefore, for a gradation value that can cause incomplete gradation when the image quality adjustment processing with a certain characteristic is performed, the image quality adjustment processing will not be done based on that characteristic, but is performed based on a characteristic that suppresses the incomplete gradation. Consequently, it is possible to obtain an image with rich gradation even if the image quality adjustment processing is performed.

This incomplete graduation includes gradation saturation in which gradation values are concentrated at an upper limit or a value near it in a high gradation range. In such a case, an image quality adjustment processing for suppressing the incomplete gradation may be performed on the image data in which there was a gradation change before the image quality adjustment processing, in a gradation range including a maximum gradation value. As a result, the gradation saturation can be suppressed in a high gradation range and thereby the image quality of an image can be maintained. Here, the gradation range including a maximum gradation value may be a range of value including a maximum gradation value, and it is possible to suppress the incomplete gradation with respect to a predetermined gradation range, or to analyze the contents of an image to be corrected and suppress the incomplete gradation based on the result of the analysis.

If the conversion characteristic in the image quality adjustment processing is such a characteristic that provides an output value larger than the input value in a high gradation range, a remarkable image quality maintenance effect is achieved by suppressing the incomplete gradation in the high gradation range. Of course, depending on the conversion characteristic, an embodiment for suppressing the incomplete gradation in a low gradation range may be employed. That is, for the conversion characteristic that provides an output value smaller than the input value, the gradation saturation may be caused by the image quality adjustment processing. Therefore, if incomplete gradation is suppressed in such a case, it is possible to maintain the gradation in a low gradation range and also perform an image correction resulting in high image quality.

The gradation range for which incomplete gradation is to be suppressed can be determined by various techniques. For example, assuming that there is a case where a processing for appropriate exposure correction and color balance correction and a processing for incomplete gradation may not be performed simultaneously as described above, a processing for suppressing incomplete gradation is performed for areas other than the area where either or both of a processing for constant-multiplying the luminance of an image and a processing for constant-multiplying the chromatic components, with different constant for each of a plurality of chromatic color components. At this time, the area for which incomplete gradation is suppressed may be identified in the gradation range. By doing such a processing, it is possible to perform an appropriate exposure correction and/or color balance correction for some area in the image, and suppress incomplete gradation for other area.

Here, it is enough to identify the area in the image for which exposure correction and color balance correction should be performed and the area for suppressing incomplete gradation, and therefore various embodiments may be employed. For example, by dividing an image into bright areas and dark areas and specifying the bright areas by means of the gradation range, it is possible to perform the processing for suppressing incomplete gradation. Of course, the image quality adjustment processing is done for other than the bright areas, for appropriate exposure correction and color balance correction. As a result, incomplete gradation can be suppressed while making appropriate exposure correction and color balance correction, and thereby high image quality can be maintained. Images for which such corrections are to be made include a backlight image.

Furthermore, when performing either or both of the processing for constant-multiplying the luminance of an image and the processing for constant-multiplying chromatic color components with different constants for each of multiple chromatic color components as the image quality adjustment processing of the present invention, such an embodiment may be employed that adjusts the degree of correction based on the relationship between the brightness and color balance within an image. That is, when performing an exposure correction and/or color balance correction on the image data by multiplying a constant, adjusting this constant according to the contents of the image will allow adjustment of correction effects.

At this time, the degree of correction is adjusted based on the relationship in luminance or color balance between the areas in an image. That is, by comparing the average luminance value of one area in the image with the other area therein, and performing a correction so that the amount of exposure correction increases as the difference between average luminance values increases, it is possible to perform a correction so that the correction effects appear more clearly according to the contents of the image. This also applies to color balance correction, i.e., by performing a correction so that the amount of color balance correction increases as the difference in color balance between areas in the image increases, it is possible to perform a correction so that the correction effects appear more clearly according to the contents of the image.

The present invention can be implemented as a print control apparatus that performs a printing based on the image data corrected as described above. That is, when printing an image by obtaining the image data representing this image, by performing a correction by the same processing as the aforementioned processing, and printing the image based on the corrected image data, it is possible to automatically and appropriately improve the image quality which could not be appropriately improved in the process of producing the image data in an image capturing device, and to print it.

DESCRIPTION OF THE PREFFERED EMBODIMENT

Figure 1:
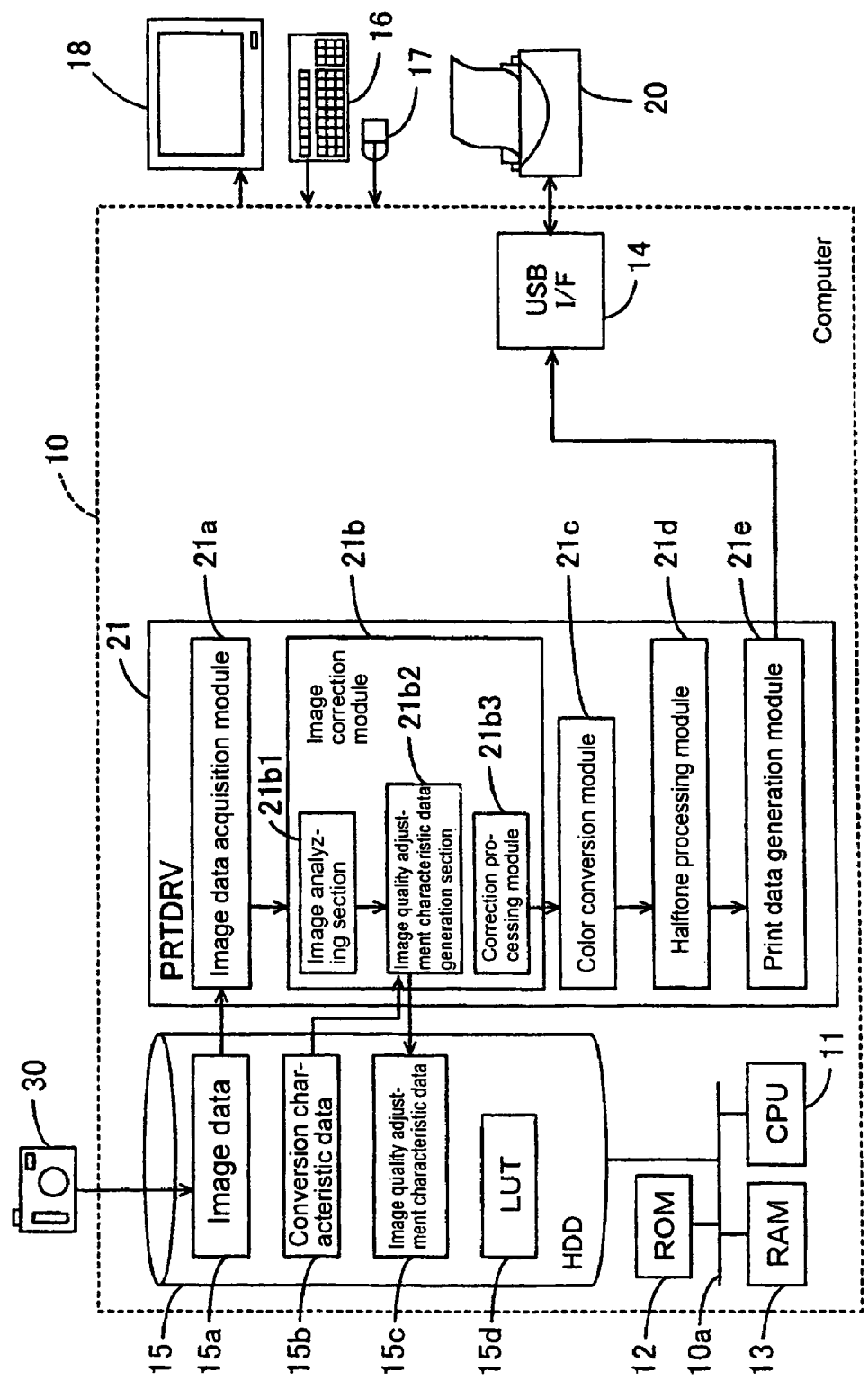
FIG. 1 is a block diagram showing the basic configuration of a print control apparatus.

Preferred embodiments of the present invention are described below in the following order:

(1) Configuration of a Print Control Apparatus (2) Print Control Processing:
   (2-1) Details of Conversion Characteristic Data
   (2-2) Details of Image Quality Adjustment Characteristic Data (3) Other Embodiments (1) Configuration of a Print Control Apparatus FIG. 1 shows the basic configuration of an image processing apparatus and a print control apparatus according to the present invention. In this embodiment, the image processing apparatus and the print control apparatus are implemented by some of the functions of a computer 10. The computer 10 has a CPU 11 comprising the heart of arithmetic processing, and the CPU 11 controls the entire computer 10 via a system bus 10a. To the system bus 10a are connected a ROM 12, a RAM 13, a USB I/F 14, a hard disk drive (HDD) 15, a CRT I/F, an input device I/F, etc. (not shown).

The hard disk drive 15 stores an operating system (OS), a printer driver (PRTDRV) 21 for performing image processing and print control, and the like, as the software, and these pieces of software are transferred to the RAM 13 as needed, for execution. The CPU 11 executes various programs under the control of the OS while accessing the RAM 13 as a temporary work area.

To the input device I/F are connected a keyboard 16 and a mouse 17 as input devices to operate the computer. To the CRT I/F is connected a display 18. This allows the computer 10 to accept the operation through the keyboard 16 or mouse 17, and display various information on the display 18. Furthermore, a printer 20 is connected to the USB I/F 14, which enables images to be printed based on the data outputted by the computer 10. Needless to say, the I/F for connecting to the printer 20 is not limited to the USB I/F, and various interfaces including parallel I/F, serial I/F, and SCSI may be employed, and any interface to be developed in the future may also be employed.

The printer 20 used in this embodiment may be an ink jet printer, a razor printer, or various other printers. Either way, the computer 10 produces print data that can be interpreted by the printer 20, and outputs it via the USB I/F 14. The printer 20 records the recording material for each pixel forming an image based on the print data, and prints the image.

Although the computer 10 constitutes an image processing apparatus and a print control apparatus in this embodiment, it is possible to operably configure such an image processing apparatus and a print control apparatus of the present invention by a program execution environment to be installed in the printer 20, and to perform the print control processing by obtaining image data from a digital camera directly coupled to the printer 20. Also, needless to say, it is possible to perform the image processing and print control processing in the digital camera, according to a similar embodiment, and other embodiments can be employed such as performing the image processing and print control processing of the present invention by means of distributed processing. In addition, the image processing and print control processing of the present invention may be performed by an apparatus, a so-called compound machine, that integrates a scanner for capturing images and a printer for printing images.

(2) Print Control Processing

The PRTDRV 21 performs a predetermined processing on an image for which a print command is issued by an application program (not shown), to print an image. The PRTDRV 21 comprises an image data acquisition module 21a, an image correction module 21b, a color conversion module 21c, a halftone processing module 21d, and a print data generation module 21e for executing a print. When the print command is issued, the PRTDRV 21 is activated, and a processing on the image data 15a is performed by respective modules to produce print data. The produced print data is output to the printer 20 via the USB I/F 14, and then the printer 20 print the image based on the print data.

Figure 2:
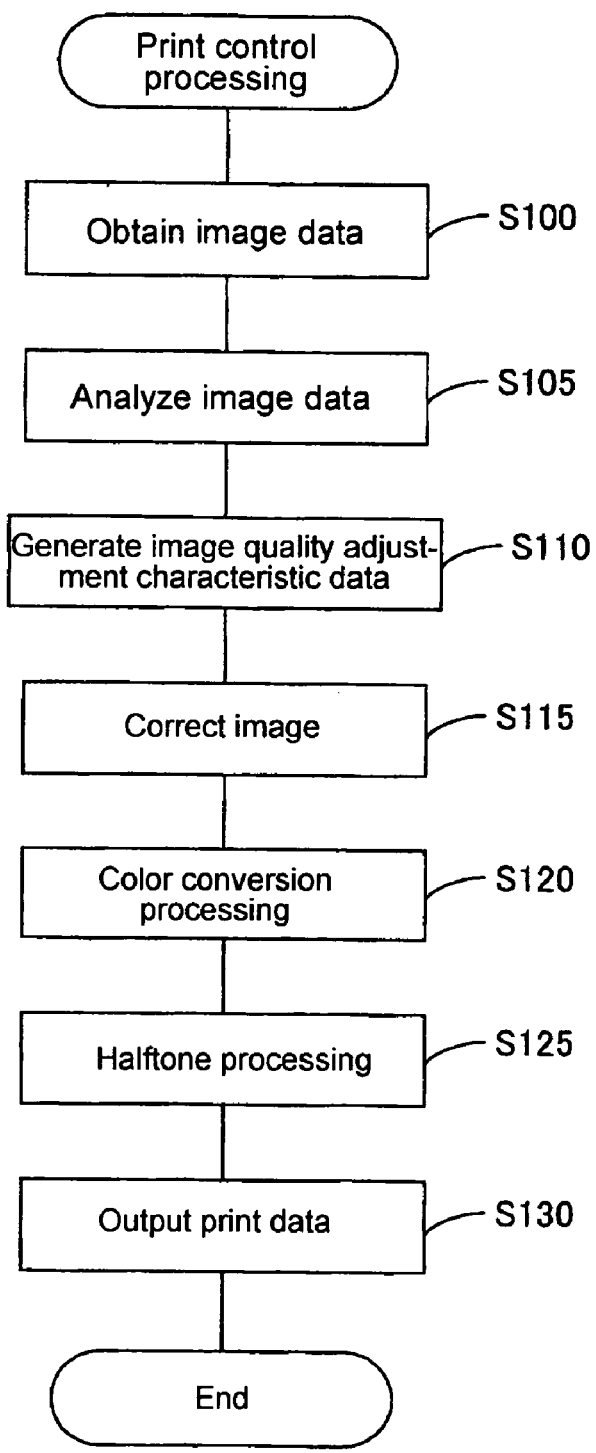
FIG. 2 is a flowchart showing the print control process.

FIG. 2 is a flowchart showing this print control processing. Specifically, when the above print command is issued, the image data acquisition module 21a first obtains the image data 15a representing an image for which the print command was issued by the application program (step S100). At this time, if the number of pixels of the image data 15a is excessive or deficient, this module performs a resolution conversion processing as needed in order to secure the number of pixels required for printing. In this embodiment, this image data 15a is data that specifies the color of each pixel by gradually representing each color component of RGB (red, green, and blue), each color consisting of 256 tones.

The image data 15a is data produced by the digital camera 30, and this data is transferred to the hard disk drive 15 through a connection cable and storage medium (not shown). In this embodiment, the manufacturer and model of the digital camera 30 is not limited, but the digital camera 30 performs a color adjustment processing within it.

That is, a sensor contained in the digital camera 30 obtains a signal that is proportional to the amount of light for each color component, though the gradation value of the image data 15a is not this signal itself, but the data on which a predetermined color adjustment processing has been performed. Although this embodiment is described using the image data 15a representing a color with RGB color components as an example, various data can be employed including the JPEG image data employing the YCbCr color specification system and the image data employing the CMYK color specification system. In this embodiment, step S100 corresponds to the aforementioned image data acquisition unit.

The image correction module 21b is a module that performs the image correction of the present invention, and comprises an image analyzing section 21b1, an image quality adjustment characteristic data generation section 21b2, and a correction processing section 21b3. The image analyzing section 21b1 analyzes image data (step S105), and grasps the details of correction to be performed on the image data 15a. That is, this embodiment is designed to perform an image adjustment by performing an exposure correction or color balance correction. At this step S105, excessive or deficient exposure or color balance disorder is detected based on the image data 15a.

Here, as an algorithm to detect excessive or deficient exposure or color balance disorder, the well-known techniques and any technique to be developed in the future can be applied. This embodiment detects excessive and deficient exposure by EV. That is, assuming that an ideal EV is "0" and EV becomes negative values when exposure is deficient, and positive values when exposure is excessive. Each time the amount of light doubles, the absolute value of EV increases by 1, and each time the amount of light increases a half time, the absolute value of EV decreases by half. Therefore, for example, EV=−1 indicates that the amount of light in the image data 15a is half the appropriate exposure, and EV=1 means that the amount of light in the image data 15a is twice the appropriate exposure.

The color balance disorder is represented by the gradation value of each color of RGB that may be obtained when a picture of a white color board is taken. For example, with G component of RGB components as a reference, color balance disorder is detected with the values of R and B components relative to G component. More specifically, when a picture of a white color board is taken using a certain reference light source, the relative values of RGB colors should be 1:1:1. However, if color balance is disordered, the relative value of RGB colors becomes x:1:y (x is not 1 and y is not 1). Then, color balance is represented with a value x of R component relative to G component and a value y of B component relative to G component, and when each of x and y is not 1 color balance is disordered. Here, it is enough to detect excessive or deficient exposure or color balance disorder, and therefore various techniques can be employed for this detection.

The image quality adjustment characteristic data generation section 21b2 produces the image quality adjustment characteristic data 15c representing the characteristic when image quality is adjusted by referring to the conversion characteristic data 15b (step S110). Here, the conversion characteristic data 15b is data that was produced in advance, and includes the data representing the reverse conversion characteristic (hereinafter referred to as forward conversion characteristic) of the predetermined color adjustment processing to be performed by the digital camera 30, and the data representing the reverse characteristic (hereinafter referred to as reverse conversion characteristic) of the forward conversion processing. Although the data representing the forward conversion characteristic and reverse conversion characteristic is assumed to be the conversion characteristic data, it is also possible to produce only one of them in advance and then produce the data representing the reverse characteristic of them with the image correction module 21b.

Either way, it is possible to obtain the image data 15a on which the color adjustment processing was not performed, by referring to the conversion characteristic data 15b. This data becomes the data for each RGB color component that is proportional to the amount of light, and therefore an exposure correction and a color balance correction can be performed by multiplying this data by a constant. Then, a conversion characteristic is assumed that can be obtained by obtaining a constant for achieving ideal exposure or ideal color balance based on the detected EV or the relative value of each color of RGB, and multiplying this constant by the data for each RGB color component that is proportional to the amount of light.

If a characteristic of conversion by such a correction is assumed, by combining the forward conversion characteristic, the characteristic of conversion by correction, and the reverse conversion characteristic, it is possible to define the image quality adjustment characteristic representing the characteristic of exposure correction or color balance correction. Then, at step S110, the image quality adjustment characteristic data 15c representing the image quality adjustment characteristic is produced and recorded on the hard disk drive 15. The above conversion characteristic data 15b and image quality adjustment characteristic data 15c are table data representing the correspondence between the values before conversion (input values) and the values after conversion (output values) with respect to multiple gradation values. Since it is enough to define the conversion characteristic, the characteristic can be defined with a function or the like.

After the image quality adjustment characteristic data 15c is produced, the correction processing section 21b3 performs image correction by referring to this image quality adjustment data 15c (step S115). That is, the gradation value for each color component in the image data 15a is converted based on the image quality adjustment characteristic data 15c. As a result, RGB data can be obtained when exposure correction or color balance correction is performed on the data for each RGB color component that is proportional to the amount of light, and the color adjustment processing is performed on the result. In this embodiment, the processing at steps S105 through S115 corresponds to the image correction unit described above.

The color conversion module 21c converts the color specification system representing the color of each pixel (step S120). Specifically, this module refers to the LUT (color conversion table) 15d stored on the hard disk drive 15, and converts the data representing colors by the RGB color specification system, into the data representing colors by the CMY color specification system. Here, the number of color components of the CMY color specification system is not limited to 3, and the number of colors of ink that is mounted on the printer 20 will be the number of color components. For example, when CMYKlclm (cyan, magenta, yellow, black, light cyan, light magenta) color inks are mounted on the printer 20, the color components of the CMY color specification system are CMYKlclm.

The LUT 15d is a table that represents colors by the RGB and CMY color specification systems, make them correspond to each other, and describes this correspondence for a plurality of colors. Accordingly, for an arbitrary color represented by the RGB color specification system, it is possible to calculate, by interpolation operation, a color of the CMY color specification system corresponding to this color, by referring to the RGB colors that are around the arbitrary color and specified in the LUT 15d, and thereby to perform color conversion.

Also, data of the CMY color specification system is image data represented gradually in the predetermined number of tones (e.g. 256 tones) for each color component of the CMY color specification system, and each gradation value corresponds to the amount of ink for each color. After color conversion is performed by the color conversion module 21c, the halftone processing module 21d converts the gradation value of each pixel represented by the CMY color specification system into halftone image data specifying the discharge/not discharge of ink for each pixel (step S125). That is, this module determines whether or not to discharge ink drops for each pixel in the printer 20.

Then, the print data generation module 21e receives such halftone image data, reorders the data in the order of being used in the printer 20, and outputs them sequentially to the printer 20, with the amount of data to be used for one main scan as a unit (step S130). The printer 20 forms an image on a print medium based on this data. In this embodiment, this corresponds to step S120.

(2-1) Details of Conversion Characteristic Data

Now, the conversion data 15b is described in detail. In the present invention, since the applicant of the present invention found that the color adjustment processing of a plurality of digital camera can be described by approximately common characteristics, a technology for, simplifying exposure correction or color balance based on the conversion characteristic data 15b has been realized.

Figure 3:
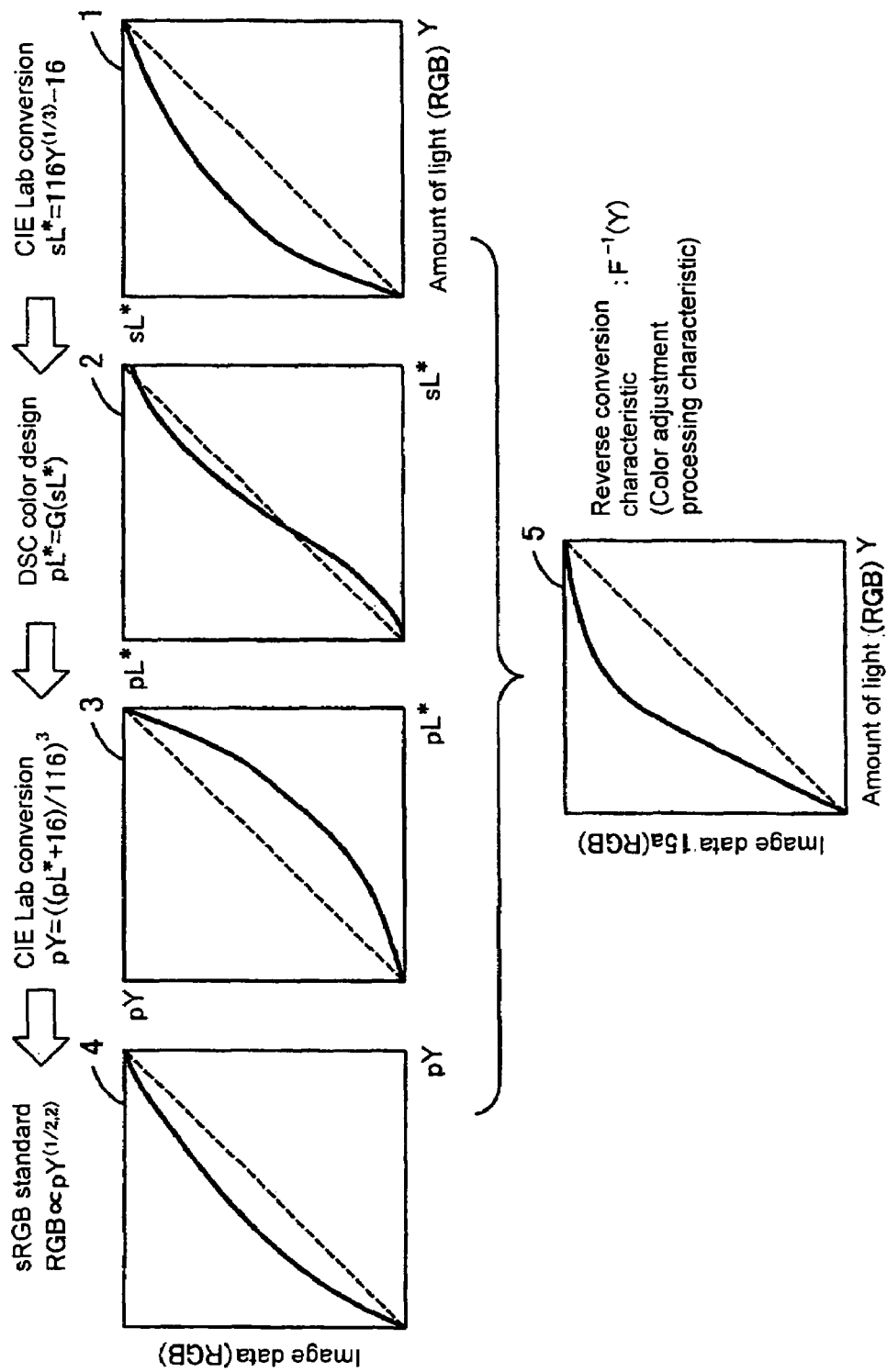
FIG. 3 is graphs showing the characteristics of a color adjustment processing.

FIG. 3 is graphs showing the characteristics of the color adjustment processing to be performed by the digital camera 30. The lower graph represents the characteristic of the color adjustment processing, i.e., the input/output characteristic equivalent to the aforementioned reverse conversion characteristic, and the upper graphs represent the input/output characteristics by dividing the characteristic of the color adjustment processing into four. In these graphs, the horizontal axis is input values and the vertical axis is output values, and each input value is converted to a corresponding output value in the graphs according to the characteristics indicated by solid lines. The dotted straight lines indicate the characteristics when an input value is equal to an output value. As shown in FIG. 3, a number from 1 to 5 is given to each graph, and hereinafter the graphs are identified with these numbers.

Graph 5 is the reverse conversion characteristic, the horizontal axis being the amount of light. The vertical axis is the image data 15a and, in this embodiment, the input/output characteristic that is the same for each color component of RGB. Accordingly, it is conceivable that this reverse conversion characteristic (the characteristic of the color adjustment processing) is converted with the input/output characteristic that represents the amount of light for each RGB color captured by a sensor of the digital camera 30, and the gradation value for each RGB color in the image data 15a is obtained. As shown in FIG. 3, the amount of light for each RGB color is represented as Y and the output value based on the reverse conversion characteristic is $F^{-1}(Y)$.

Graphs 1 through 4 are the input/output characteristics that can be obtained by dividing the reverse conversion characteristic in order to extract the color adjustment processing unique to the digital camera 30. Graphs 1, 3, and 4 are the adjustment processing for converting the color specification system of gradation values, and graph 2 is the adjustment processing for improving the appearance of an image. The manufacturer of the digital camera 30 is assumed to be performing its own color adjustment processing in order to improve the appearance of an image, but the appearance of an image is a matter that should be determined in view of how each color of RGB is perceived to human eyes.

Therefore, the color adjustment processing was divided as shown in graphs 1 to 4, assuming that a processing for improving the appearance with a signal in such a state that allows easy perception by human eyes is included in the processing for converting a signal, is proportional to the amount of light into a signal conforming to the sRGB standard. That is, graph 1 is a characteristic for converting a value that is proportional to the amount of light, into a value that is proportional to the brightness perceptible by human eyes, graph 2 is a characteristic for converting a value that is proportional to the brightness perceptible by human eyes, into a value that improves the appearance of an image. Graphs 3 and 4 are characteristics for converting a value for improving the appearance of an image, into a signal conforming to the sRGB standard.

Specifically, the horizontal axis of graph 1 is the amount of light (aforementioned Y) and the vertical axis is values equivalent to the luminance L* (sL* described below). That is, since the brightness perceptible by a human varies with increases in the value of luminance L*, if expression (1) of the CIELab is used that converts the luminance of three stimulus values, $$L* = 116Y^{\frac{1}{3}} - 16 \quad (1)$$

it is possible to describe the characteristic for converting the amount of light Y into a value equivalent to the luminance L*. In this embodiment, the digital camera 30 acquires a signal indicating the amount of light for each RGB color. If the amount of light Y of each color of RGB is substituted in expression (1), a gradation value that is proportional to the brightness perceptible by a human can be obtained for each color of RGB. In this embodiment, this value is called sL*.

The horizontal axis of graph 2 is the sL* and the vertical axis is converted values for improving the appearance of an image; this value is called pL* in this embodiment. This input/output characteristic is determined by the manufacturer of the digital camera 30, but, according to the analysis by the applicant of the present invention, even if there is little difference among manufacturers, it was found that the input/output characteristic of respective manufacturers can be described with roughly the same characteristic. That is, as shown in graph 2 of FIG. 3, the input/output characteristic can be described by an S-shaped curve (pL*=G(sL*)) where input values are converted to a smaller output value for tones below halftone, and input values are converted to a larger output value for tone above halftone.

Figure 4:
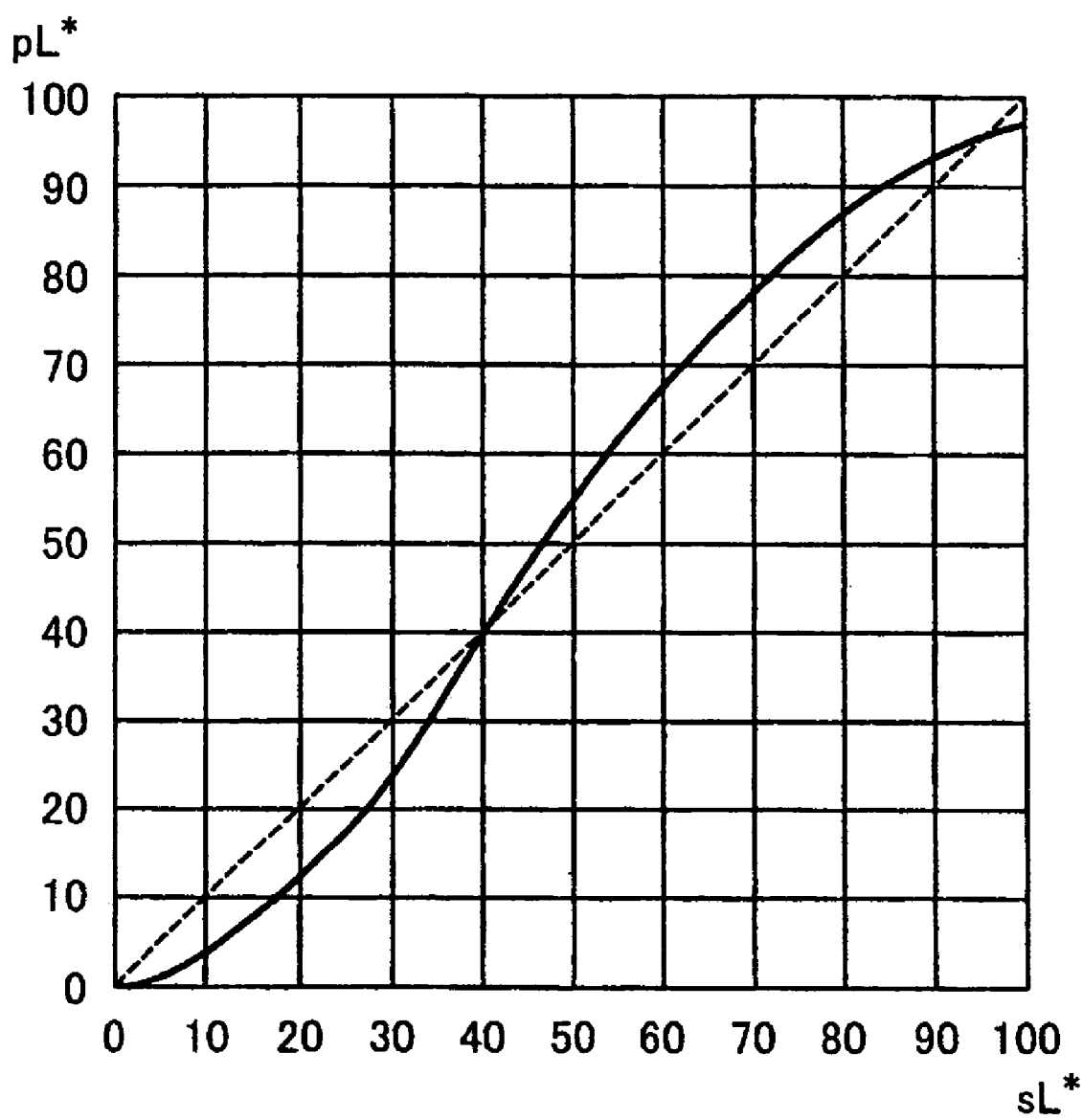
FIG. 4 is an enlarged graph showing the input/output characteristic G (sL*)

FIG. 4 is a graph in which the input/output characteristic G(sL*) of graph 2 is enlarged. If the input/output characteristic G(sL*) shown by the solid line in the figure is analyzed in the direction in which the input value increases from "0", the rate of change of the input/output is 1 or less and gradually increase in the low gradation range, and the input becomes equal to the output at around gradation value "40". The rate of change increases for a while after the gradation value exceeded "40", and becomes about 1.1 to 1.4 at gradation value "50". The rate of change begins to drop again when gradation value exceeded "60", and becomes "1" at around "70", and then drops down to "100".

This input/output characteristic G(sL*) made it possible to describe the color adjustment processing that should have been determined by many manufacturers. That is, analyzing the color adjustment processing by many manufacturers as shown in graphs 1 through 4 and extracting the input/output characteristic equivalent to graph 2 approximately resulted in the roughly S-shaped curve as shown by the solid line in FIG. 4, and the rate of change exceeded "1" at an input value less than gradation value "50", and was around 1.1 to 1.4 at gradation value "50" or so. Also, the rate of change was "1" near gradation value "70" that is equivalent to the luminance of flesh color. Therefore, by determining the input/output characteristic G(sL*) as shown in FIG. 4, it is possible to describe almost the same characteristic as the color adjustment processing determined by many manufacturers.

The horizontal axis of graph 3 in FIG. 3 is the pL* and the vertical axis is the value pY equivalent to the amount of light, and the horizontal axis of graph 4 is the value pY equivalent to the amount of light and the vertical axis is the gradation values in the image data 15a. As described above, since each input/output characteristic shown in FIG. 3 is applied to each RGB color, values can be also obtained for each RGB color in graph 4.

Here, graphs 3 and 4 are input/output conversion for obtaining image data conforming to the sRGB standard, from the pL*. That is, under the sRGB standard, each data of RGB is obtained as data that is proportional to (1/2. 2) root of the amount of light of each color. Therefore, in graph 3, a value equivalent to the amount of light is obtained from the pL* equivalent to luminance by the expression (2) of CIELab;

$$pY = \left(\frac{(pL*+16)}{116}\right)^3 \quad (2)$$

Since the above conversion enables obtaining the amount of light pY after performing a conversion for improving the appearance of an image, the γ conversion is applied, in graph 4, to this amount of light pY, based on the following expression (3):

$$RGB = pY^{\frac{1}{2.2}} \quad (3)$$

where RGB is the data for each RGB color. In expression (3), it is enough to calculate the data that is proportional to (1/2.2) root of the amount of light, and it is possible to multiply the right term of the expression by an coefficient.

From the above analysis, it is found that graph 5, which is a combination of the input/output characteristics of graphs 1 through 4 is, is able to describe almost the same characteristic as the color adjustment processing by the manufacturer of the digital camera 30. Accordingly, in the present invention, a table representing the reverse conversion characteristic F-1 (Y) and the forward conversion characteristic Y=F(RGB), where (RGB) is the gradation value of one of RGB, are assumed to be the conversion characteristic data 15b. As a result, it is possible to convert the image data 15a into a value that is proportional to the amount of light by the forward conversion characteristic F(RGB), or convert a value that is proportional to the amount of light into the image data 15a by the reverse conversion characteristic F-1(Y).

(2-2) Details of Image Quality Adjustment Characteristic Data

Now, the image quality adjustment characteristic data 15c is described. According to the present invention, it is possible to convert the image data 15a into a value that is proportional to the amount of light, or convert a value that is proportional to the amount of light into the image data 15a. Therefore, exposure correction and color balance correction are performed by making an adjustment with a value that is proportional to the amount of light, and the input/output characteristic representing these corrections are assumed to be the image quality adjustment characteristic data 15c.

Figure 5:
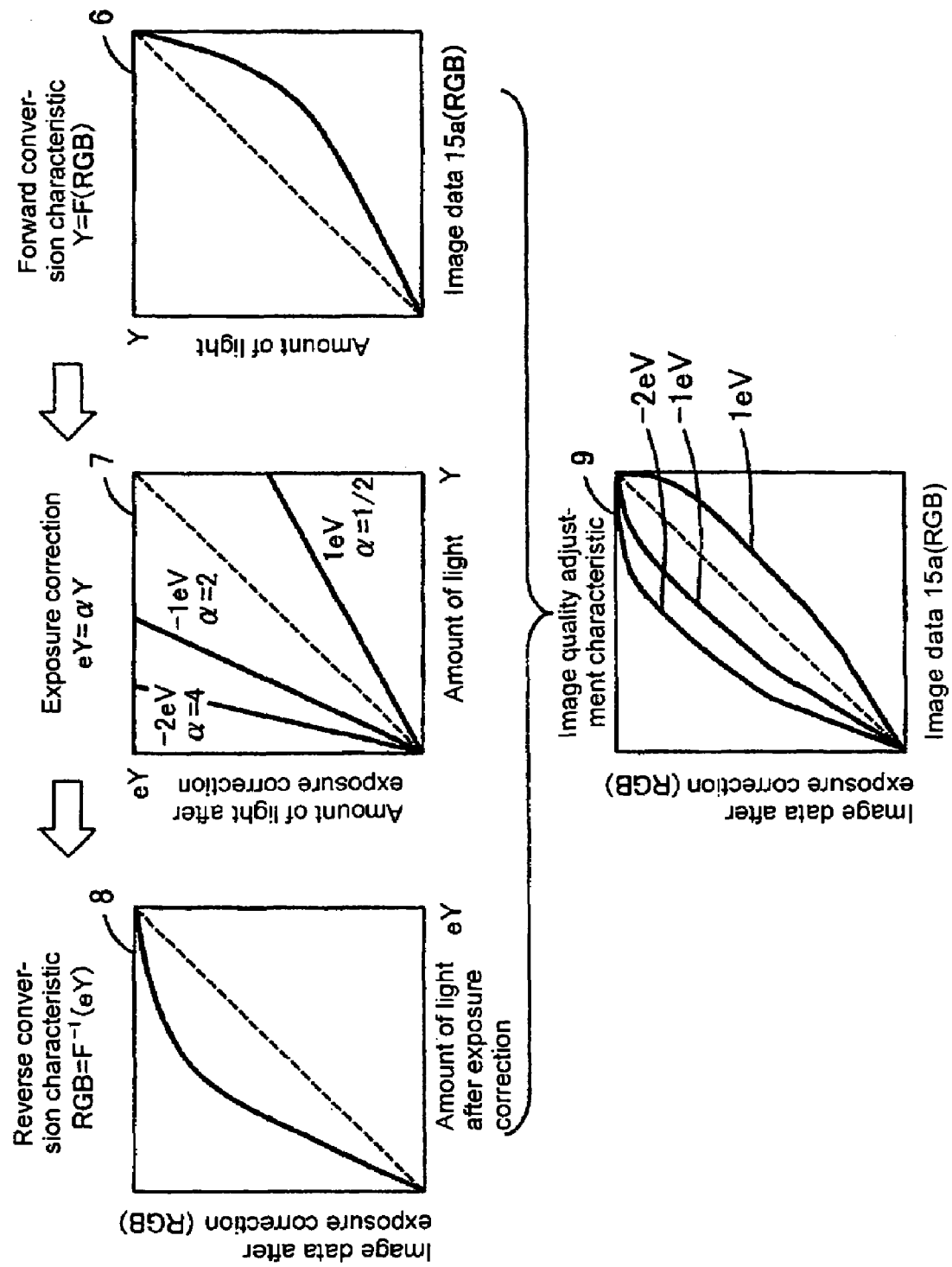
FIG. 5 is graphs showing how exposure correction is performed.

FIG. 5 is graphs showing how exposure correction is performed. The lower graph shows the image quality adjustment characteristic when exposure correction is performed, and the upper graphs show the characteristics of the conversion processing to be performed to obtain the image quality adjustment characteristic. In these graphs, the horizontal axis is input values and the vertical axis is output values, indicating that each input value is converted to an corresponding output value according to the characteristic shown by the solid line. Here again, the dotted line indicates the characteristic when an input value and an output value are the same. Also, in FIG. 5, a number from 6 to 9 is given to each graph, and therefore the graphs are identified with those numbers.

Graphs 6 and 7 are the forward conversion characteristic and reverse conversion characteristic respectively, and graph 7 is the input/output characteristic of exposure correction. That is, according to the forward conversion characteristic shown in graph 6, it is possible to convert gradation values of the image data 15a to the amount of light Y for each color component of RGB. Since exposure correction can be made by constant-multiplying the amount of light, exposure correction characteristic is specified by increasing the amount of light Y α times as in graph 7.

Constant α is a constant that is calculated from EV detected at step S105, and if EV is a negative number α is 2|EV|, and if a positive number α is (½)EV. For example, if EV="−1" α is 2, and if EV="1" α is ½. Also, in FIG. 5, the amount of light after exposure correction is represented as eY, and the horizontal axis is the amount of light Y and the vertical axis is the amount of light eY after exposure correction. If the amount of light eY after the exposure correction is converted by the reverse conversion characteristic F-1 as in graph 8, it is possible to obtain the image data after exposure correction for each color component of RGB.

Graph 9 is the result of a combination of the conversion characteristics of graphs 6 through 8, and is the image quality adjustment characteristic. That is, the horizontal axis is each color component value of RGB in the image data 15a, and the vertical axis is the image data after exposure correction for each color component of RGB. Thus, by utilizing the forward conversion characteristic and the reverse conversion characteristic, it is possible to define the image quality adjustment characteristic data 15c for each EV, by very simple correction as in graph 7.

This image quality adjustment characteristic data 15c has a very complicated shape as shown in graph 8, and it is very difficult to manually define the input/output characteristic by using a manually-operated UI. It is also difficult to automatically define an appropriate nonlinear characteristic not based on such an analysis as in the present invention. In the present invention, however, the conversion characteristic data 15b is prepared in advance as described above, and it is known that this conversion characteristic data 15b describes the color adjustment processing that has been performed by the digital cameras 30. Therefore, according to the present invention, the complicated image quality adjustment characteristic data can be defined by a very simple processing like graph 7, and also it is possible to perform an appropriate exposure correction with this data.

Figure 6:
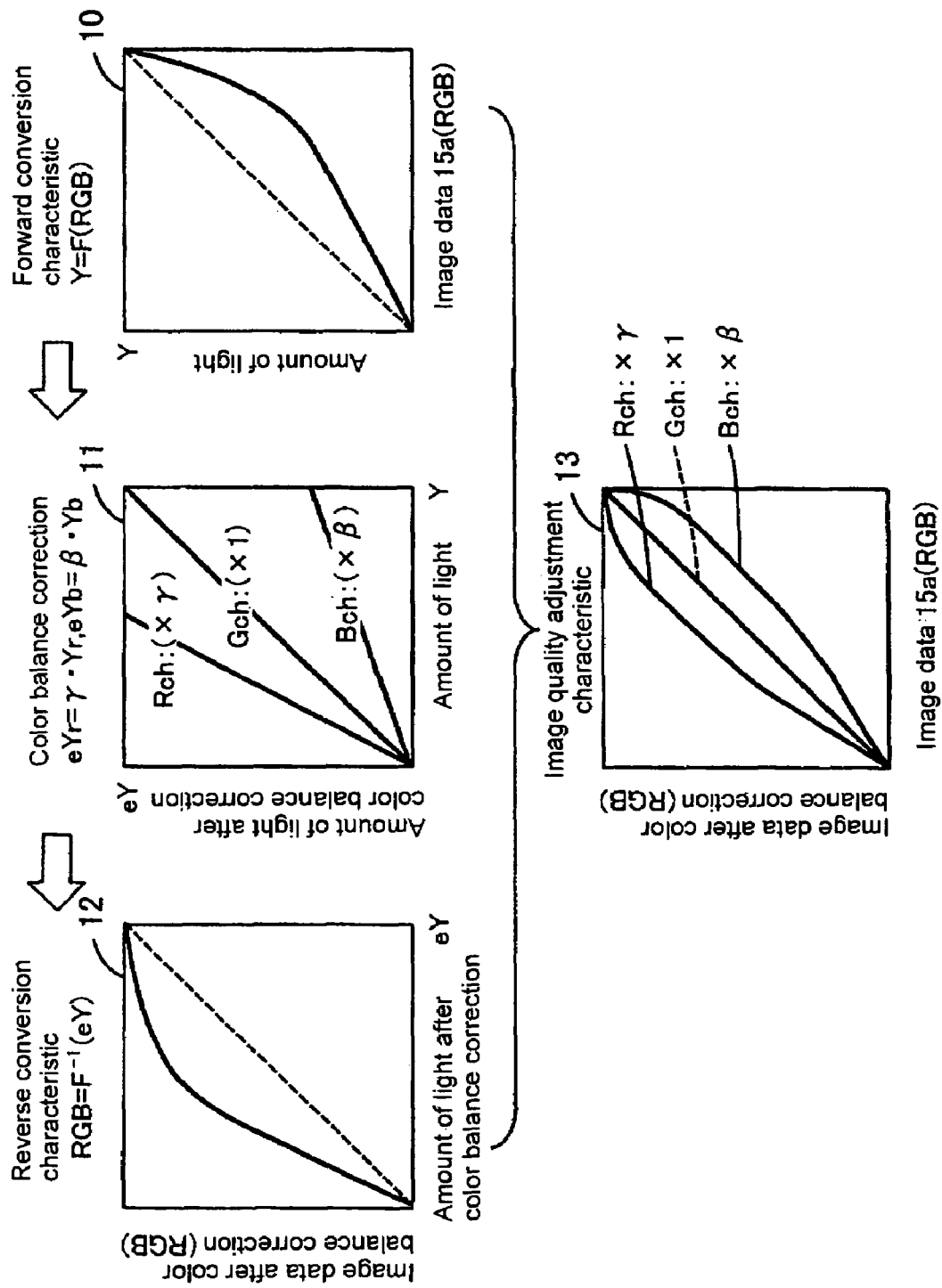
FIG. 6 is graphs showing how color balance correction is performed.

FIG. 6 is a graph showing color balance correction. The lower graph represents the image quality adjustment characteristic when a color balance correction has been performed, and the upper graphs represent the characteristic of the conversion processing that is to be performed to obtain the image quality adjustment characteristic. In these graphs, the horizontal axis is input values and the vertical axis is output values, indicating each input value is converted to an corresponding output value in the graphs according to the characteristics shown by solid lines. Here again, the dotted line represents the characteristic when an input value and an output value are the same. Also, in FIG. 6, a number from 10 to 13 is given to each graph, and therefore the graphs are identified with these numbers.

Graphs 10 and 12 are the forward conversion characteristic and the reverse conversion characteristic respectively, and graph 11 is the input/output characteristic of color balance correction. That is, according to the forward conversion characteristic shown in graph 10, it is possible to convert the gradation value of the image data 15a into the amount of light Y for each color component of RGB. Color balance correction can be made by constant-multiplying the amount of light with a different constant for each color component of RGB. In this embodiment, an input value and an output value are the same with G component as a reference component, as in graph 11, and the color balance correction characteristic is defined by multiplying R component by γ, and B component by β.

The constants γ and β are calculated based on the "value x of R component relative to G component" and "value y of B component relative to G component" detected at step S105. That is, when a value of R component relative to G component is x, R component becomes a gradation value that is x times larger, as compared the value when color balance is appropriate, and therefore constant γ=1/x. Similarly, constant β=1/y. Also, in FIG. 6, the amount of light after color balance correction is represented as eY, and the horizontal axis is the amount of light Y and the vertical axis is the amount of light eY after color balance correction. (Needless to say, in this embodiment, since a constant to be multiplied for R component is different from a constant for B component, actually the amount of light eYr, eYg, or eYb after correction is obtained for the amount of light Yr, Yg, or Yb for each RGB respectively, and eYr=γ·Yr, eYb=β·Yb, eYg=Yg.)

If the amount of light eY after the color balance correction is converted with the reverse conversion characteristic as in graph 12, the image data after color balance correction can be obtained for each color component of RGB. Graph 13 is the result of a combination of the conversion characteristics of graphs 10 through 12, and is the image quality adjustment characteristic. That is, the horizontal axis is each color component of RGB in the image data 15a, and the vertical axis is the image data after color balance correction is performed for each color component of RGB. Thus, also for color balance correction, the image quality adjustment characteristic data 15c can be defined by a very simple correction as in graph 11, by utilizing the forward conversion characteristic and reverse conversion characteristic. Although the exposure correction and the color balance correction are separately described so far, if both corrections are to be performed, both corrections may be done after a conversion with the forward conversion characteristic, and the image quality adjustment characteristic data 15c may be defined assuming that a conversion with the reverse conversion characteristic has been done.

(3) Other Embodiments

In the above embodiments, assuming that the digital camera performs some sort of color adjustments, corrections based on simple calculations are realized by defining the reverse conversion characteristic equivalent the color adjustment processing and the forward conversion characteristic that is opposite to the reverse conversion characteristic. However, the conversion data 15b may be considered as data for converting each color component value of the image data 15a to a value that is proportional to the amount of light. Therefore, the analysis made when producing the conversion characteristic data 15b is not limited to the embodiment assuming the color adjustment processing that may be performed by the manufacturer of the digital camera 30, and it is enough to define the conversion characteristic between the amount of light and the image data 15a.

Also, the present invention is not limited to the embodiment that produces the conversion data 15b in advance and record it on the hard disk drive 15, but it is enough to provide availably the conversion characteristic data to the image adjustment characteristic data generation section 21b2 for processing therein. For example, an embodiment wherein the conversion characteristic data 15b is included in the image data 15a may be possible. This image data 15a includes image data conforming to such standards as Print Image Matching (PIM, a registered trademark of Seiko Epson Corporation) and Exit Print (Exif, a registered trademark of Electronic Information Technology Industry Association).

In other words, since the data conforming to such standards allows describing, in the tag area of an image file, the relationship between the signal value at a sensor of the digital camera and the image data 15a, this tag is used. What is described using this tag is determined by the manufacturer of the digital camera 30, and therefore it is possible to obtain the conversion characteristic data 15b faithfully reflecting the color adjustment processing to be performed by each manufacturer, and thereby to produce accurate image quality adjustment characteristic data 15c.

Also, the format of the image data 15a is not limited to the embodiment using the RGB color components as described above, and colors may be specified using, for example, the YCbCr color components. In this case, since the conversion characteristic data 15b is such data that convert YCbCr color components into YcbCr color components, the input/output characteristic for converting color specification system is specified as required, and a gradation value is proportional to the brightness perceptible by a human is assumed. Then, by extracting a color adjustment processing characteristic almost common to many manufacturers, the conversion characteristic data 15b can be defined.

Furthermore, since the present invention only requires that corrections be performed by the image correction module 21b, various embodiments can be adopted including an embodiment that produces the image quality adjustment characteristic data 15c as described above. For example, instead of producing, in advance, the image quality adjustment characteristic data 15c for all the input values, the processing of graphs 6 to 8 in FIG. 5 and graphs 10 to 12 in FIG. 6 may be performed on only the required input values.

That is, the image data 15a is converted to the amount of light based on the forward conversion characteristic, color balance correction is performed based on the converted data, and the processing for reverse-converting the RGB data based on the reverse conversion characteristic. Repeating this processing for all the pixels makes it possible to perform corrections on the image data 15a. Of course, for the values of the image data 15a on which a conversion was performed once, it is desirable to store temporally that conversion characteristic in order to reuse the conversion characteristic when a pixel of the same data becomes the pixel to be processed again.

Also, such an embodiment may be employed that calculates the image quality adjustment characteristic in advance for the absolute values of a plurality of EVs or RCB colors and combinations thereof, and records the calculated characteristic as table data on the hard disk drive 15. According to this embodiment, the processing by the image quality adjustment characteristic data generation section 21b2 is not required, and an appropriate image quality adjustment characteristic table may be selected after the analysis by the image analyzing section 21b1.

Also, an embodiment may be employed that stores the input/output characteristic shown in graph 2 of FIG. 3 on the hard disk drive 15, rather than the reverse conversion characteristic or forward conversion characteristic. That is, in FIG. 3, graphs 1, 3, and 4 can describe the input/output characteristic with a predetermined expression. Accordingly, if the input/output characteristic representing graph 2 is predetermined, it is possible to describe the reverse conversion characteristic as well as the forward conversion characteristic, by combining graphs 1, 3, and 4.

In addition, it is possible to employ an embodiment that limits the range in which the image correction of the present invention is applied, and thereby to prevent incomplete gradation due to image correction. That is, as shown in graph 9 of FIG. 5, the image data after exposure correction resulted in smaller degree of change in output values relative to input values on the high gradation side (RGB value is large, high luminance range), and the change is saturated depending on the amount of exposure correction. If the change of output values is saturated, incomplete gradation occurs and the image quality deteriorates.

The incomplete gradation can be prevented by not applying image correction, shown in graph 8, to the area where the image data exceeds a certain gradation value, in order to provide an input/output characteristic that prevents the saturation of output values. To this end, for example, a configuration almost identical to that shown in FIG. 1 may be employed, and part of the processing performed by the image analyzing section 21b1 and the image quality adjustment characteristic data generation section 21b2 as shown in FIG. 2 may be changed to such a processing as shown in FIG. 7.

Figure 7:
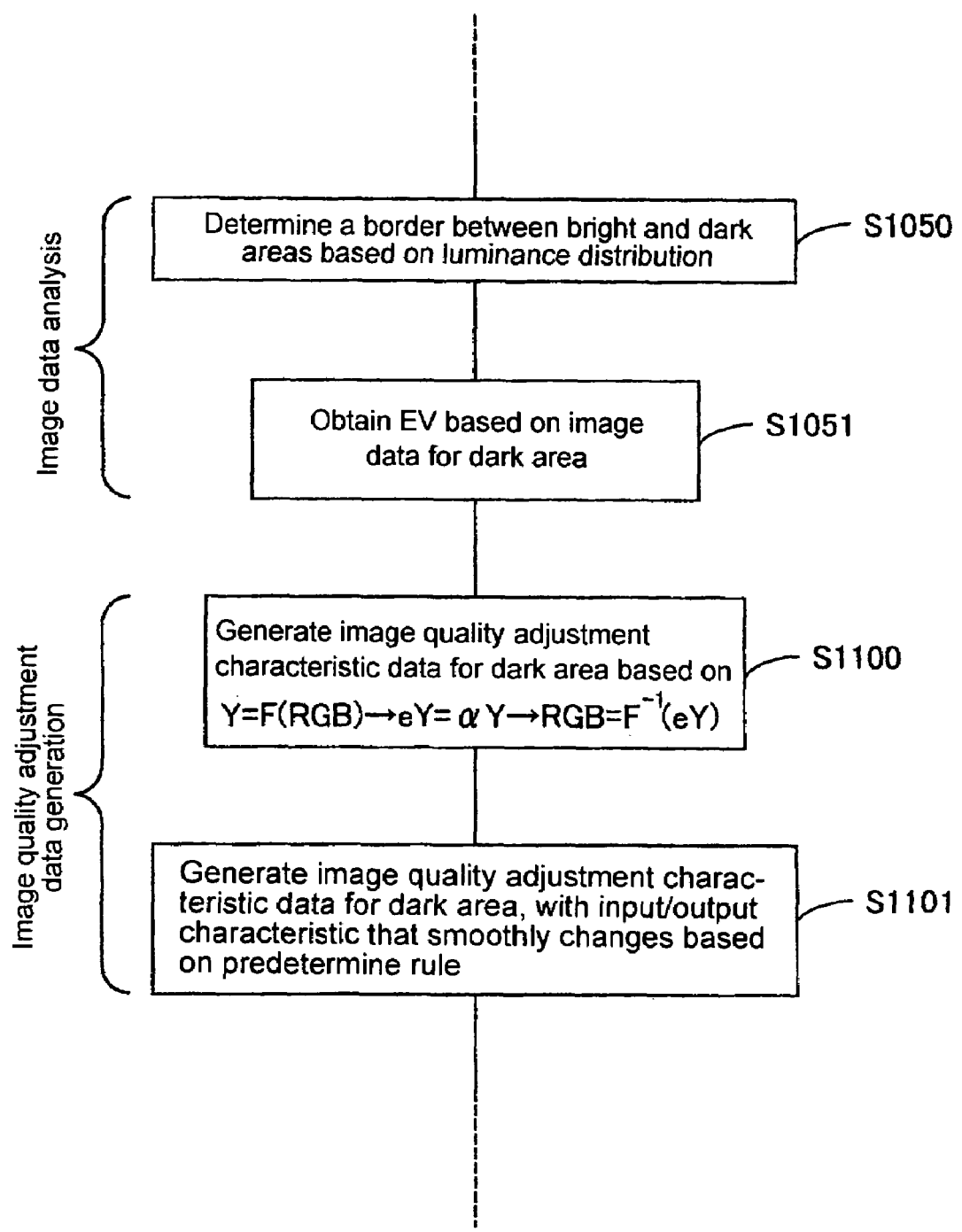
FIG. 7 is a flowchart showing the print control process according to another embodiment.

FIG. 7 is a flowchart showing the process wherein a processing different from the processing shown in FIG. 2 is performed during the print control processing. Steps S1050 and S1051 are processing steps to be performed in place of step S105 shown in FIG. 2, and steps S1100 and S1101 are processing steps to be performed in place of step S110 shown in FIG. 2. In this embodiment, when image data is obtained at step S100 as in FIG. 2, the luminance components for each pixel is calculated based on the RGB color components of the image data. Then, the luminance distribution (histogram) is calculated from the luminance components and the border Bo separating between the bright area and the dark area in the image (step S105).

In this embodiment, the EV is determined based on the image data (image data for the dark area) of a pixel having the luminance below the border Bo (step S1051), and the image quality adjustment characteristic data 15c is produced for the image data for the dark area, according to the same concept as in FIG. 5 (step S1100). Therefore, appropriate exposure correction can be achieved by referring to the image quality adjustment characteristic data 15c for the dark area. Since the image quality adjustment characteristic data 15c represent the input/output characteristic using RGB values as input values, it is necessary to define the dark area for RGB values as well. However, bright and dark areas may be defined with each RGB value equal to the luminance of the border Bo as a border, or various embodiments may be employed including an embodiment that determines the RGB value equivalent to the luminance value of the border Bo.

For the remaining bright areas, in order to reduce the incomplete gradation, the input/output characteristic is defined so that output values vary smoothly relative to input values based on the predetermined rules, to produce the image quality adjustment characteristic data 15c (step S1101). Accordingly, for the bright areas, it is possible to perform corrections while suppressing incomplete gradation, by referring to the image quality adjustment characteristic. Thus, after the input/output characteristic produced based on different concepts for bright and dark areas has been defined and the image quality adjustment characteristic data 15c has been created, steps S115 through S130 in FIG. 2 are performed and the print control processing is concluded.

Figure 8:
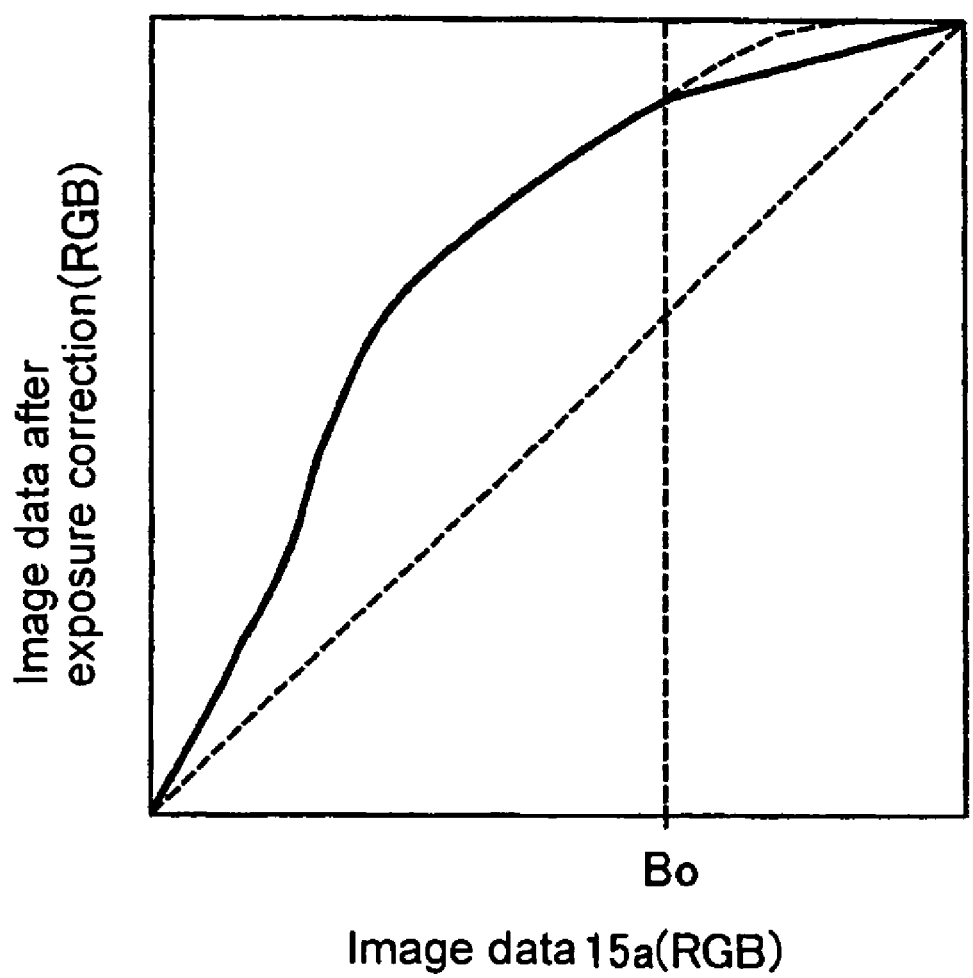
FIG. 8 shows an example of the input/output characteristic of image quality adjustment characteristic data according to another embodiment.

FIG. 8 shows an example input/output characteristic of the image quality adjustment characteristic data 15c thus created. Here again, the horizontal axis is each RGB color component value in the image data 15a and the vertical axis is the image data after exposure correction has been made on each RGB color component, just like graph 9 in FIG. 5. In this graph, if each value of RGB is below the border Bo the correction of the present invention is to be made, and when RGB values are below the border Bo, the input/output characteristic is the same as that of graph 9 in FIG. 5. Therefore, even if the color adjustment processing is performed in the digital camera 30, exposure correction can be made appropriately. Of course, this characteristic can vary according to the amount of exposure correction, and FIG. 8 shows the input/output characteristic when a correction of "−2 eV" is made. Also, for areas where RGB values are above the border Bo, the outputs linearly vary with the inputs. Hence, no incomplete gradation occurs for particular input values.

Figure 9:
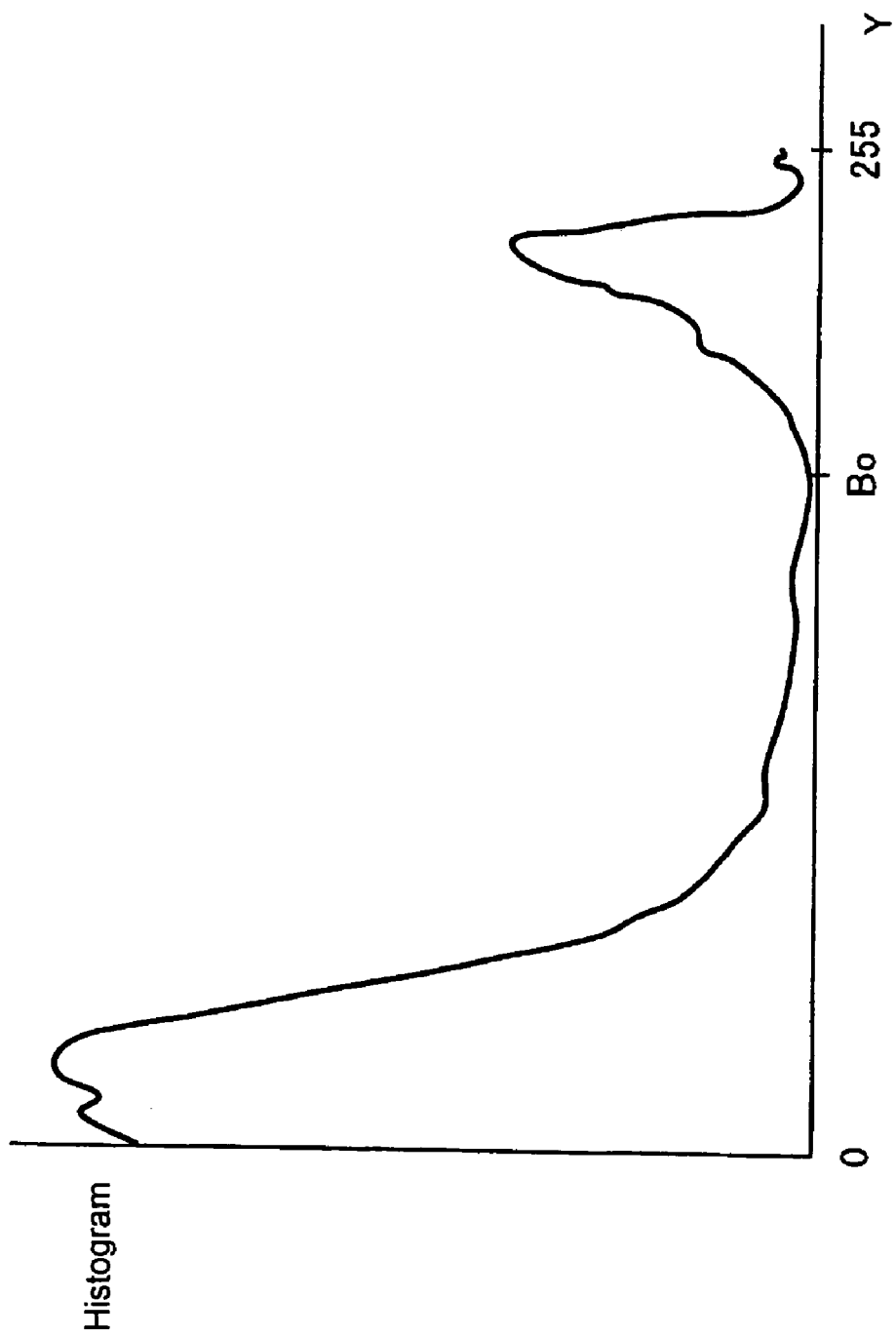
FIG. 9 is a graph showing an example luminance distribution.

The advantage of the processing based on the image quality adjustment characteristic data 15c described above appears prominently in images taken against the light (backlit images). FIG. 9 shows a luminance distribution of a backlit image including bright areas in the background other than main areas of the image. As shown in the figure, in the luminance distribution of a backlit image, frequencies are often concentrated to some extent at high and low luminance areas, and low luminance areas become the main areas of an image. Since the main areas of an image have low luminance, performing the exposure correction based on the information about these main areas allows appropriate exposure correction.

However, all the high luminance areas are not background, and if incomplete gradation occurs, undesired areas such as part of a human face may become high luminance. If a correction shown in graph 9 in FIG. 5 is made as described above, although incomplete gradation may occur in high luminance areas, the incomplete gradation can be suppressed since output values change smoothly relative to input values in high luminance areas and also saturation of the changes in output values is prevented. Accordingly, by separating bright areas from dark areas i.e., defining main areas of an image as dark areas and the other areas as bright areas, it is possible to perform a correction such that main areas have appropriate exposure while suppressing incomplete gradation in high luminance areas.

At step S1050, it is enough to separate bright areas from dark areas of an image based on the luminance, and therefore various techniques can be employed. That is, it is enough at this step to define a border between the bright and dark areas of an image, and defining the border so that incomplete gradation can be suppressed on the high luminance side of the border and appropriate image quality can be obtained on the low luminance side. For example, a predetermined luminance may be defined as a border, in which case calculation of luminance distribution is not necessary. To differentiate the input/output characteristic between main areas and non-main areas, it is enough to separate bright areas from dark areas based on luminance distribution, for example, determining the border Bo so that the sum of the frequencies on the high luminance side and that on the low luminance side are in a predetermined ratio, and therefore various embodiments may be employed.

Of course, in the above embodiment, it is enough to perform an appropriate exposure correction on part of the gradation range and perform a correction to prevent incomplete gradation on the other part, and therefore the image to be corrected is not limited to an backlit image. That is, it is possible to apply to an image in which a human face is a bright area and the background is a dark area, which allows an exposure correction to be performed while preventing incomplete gradation on the human face. Also, such an embodiment may be employed that changes the concept of input/output characteristic for each gradation range with respect to color balance correction as shown in FIG. 6, that is, an embodiment that applies graph 13 to part of an image so as to achieve appropriate color balance and prevent the saturation of an output values in order to prevent incomplete gradation, for the other parts.

However, incomplete gradation may occur in other than high gradation range, and may be caused by other than saturation of output values. For example, unlike the image quality adjustment characteristic shown in graphs 9 and 13, in the case of a characteristic where output values are saturated in a low gradation range below a predetermined border when a correction is performed so as to make the output value smaller than the input value, a correction may performed to suppress incomplete graduation so that the output value will not be saturated in the low gradation range. Also, when a plurality of outputs can be allocated to the same input value (i.e., a plurality of output values can correspond to a maximum input value) as shown in 1 eV of graph 9, the input/output characteristic may be defined so that the output value varies linearly from a certain input gradation value to a maximum input gradation value. Of course, if image quality looks more deteriorated due to this definition, incomplete gradation may be allowed.

In addition, various techniques may be employed for determining the amount of exposure correction. For example, it is possible to separate the main area (e.g. the center of an image or a human face) from the other area, and adjust the amount of exposure correction based on the average luminance of both areas. In other word, even when the main area is at an average luminance, if the other area is brighter than the average luminance or darker than that, the effect of exposure correction will not readily appears in the former case, but readily appears in the latter case.

Accordingly, by predetermining the amount of exposure based on a predetermined rule, and varying this amount of exposure according to the average luminance of the main area and the other area of an image, it is possible to set the amount of exposure to a more appropriate correction value. Also, for the color balance correction shown in FIG. 6, such an embodiment may be employed that changes the amount of color balance correction based on the luminance and color balance for each area. As the embodiment for separating the main area from the other area in this case, various embodiments may be employed, such as identifying the main area by extracting a predetermined pattern including a human face, or defining a predetermined area as the main area.

Incidentally, the aforementioned image processing apparatus and print control apparatus include various embodiments according to the concept of the present invention, such as implementing independently, or implementing together with other methods by being incorporated in certain equipment, and therefore can be modified as needed. Also, the image processing and print control techniques described above may be applied as method, which will have the same effect basically.

The image processing and print control that are implemented as a method can be understood as follows.

An image processing method for performing an image correction on an image, comprising:
an image data acquisition step for obtaining image data produced by an image capturing device; and
an image correction step for performing a conversion processing equivalent to the reverse of a color adjustment processing which is performed when the image capturing device produces the image data, and producing image quality adjusted data, based on the image data, that represent an image obtained when an image quality adjustment processing is performed on the data after the conversion processing.

An image processing method for performing an image quality correction on an image, comprising:
an image data acquisition step for obtaining image data representing an image with gradation values that vary linearly with the amount of light; and
an image correction step for performing a conversion processing to convert the image data so that the gradation values vary linearly with the amount of light, and producing image quality adjusted data, based on the image data, that represent an image obtained when an image quality adjustment processing is performed on the data after the conversion processing.

A print control method for controlling a printer, comprising:
an image data acquisition step for obtaining image data produced by an image capturing device;
an image correction step for performing a conversion processing equivalent to the reverse of a color adjustment processing which is performed when the image capturing device produces the image data, and producing image quality adjusted data, based on the image data, that represent an image obtained when an image quality adjustment processing is performed on the data after the conversion processing; and
a printing step for performing a printing based on the image quality adjusted data.

When attempting to implement the present invention, there may be a case where a predetermined program is executed on an image processing apparatus and/or a print control apparatus. Therefore, the present invention can be implemented as such a program, which will have the same effect basically.

The image processing and print control that is implemented as a program can be understood as follows.

An image processing program to perform an image correction on an image, which causes a computer to provide:
an image data acquisition function to obtain image data produced by an image capturing device; and
an image correction function to perform a conversion processing equivalent to the reverse of a color adjustment processing which is performed when the image capturing device produces the image data, and to produce image quality adjusted data, based on the image data, that represent an image obtained when an image quality adjustment processing is performed on the data after the conversion processing.

An image processing program to perform an image correction on an image, which causes a computer to provide:
an image data acquisition function to obtain image data representing an image with gradation values that vary linearly with the amount of light; and
an image correction function to perform a conversion processing to convert the image data so that the gradation values vary linearly with the amount of light, and to produce image quality adjusted data, based on the image data, that represent an image obtained when an image quality adjustment processing is performed on the data after the conversion processing.

A print control program to control a printer, which causes a computer to provide:
an image data acquisition function to obtain image data produced by an image capturing device;
an image correction function to perform a conversion processing equivalent to the reverse of a color adjustment processing which is performed when the image capturing device produces the image data, and producing image quality adjusted data, based on the image data, that represent an image obtained when an image quality adjustment processing is performed on the data after the conversion processing; and
a printing function to perform a printing based on the image quality adjusted data.

Needless to say, it is possible to make the embodiments described in claims 2 to 7 correspond to the above methods or programs. Also, any storage medium can be used for providing the program, including the magnetic recording medium, the magnetooptical recording medium, and any recording medium to be developed in the future. Furthermore, an embodiment consisting of software and hardware will conform to the concept of the present invention. This includes an embodiment wherein part of the program is stored on a storage medium and read into the computer as needed. The same applies to a duplication stage such as primary and secondary duplications.

I claim:

1. An image processing apparatus comprising:
an image acquisition unit for obtaining image data produced by an image capturing device; and
an image correction unit for performing a conversion processing that is the reverse of a color adjustment processing performed when said image capturing device produces said image data, and producing, based on said image data, image quality adjusted data that represents an image obtained when an image quality adjustment processing is performed on the data after said conversion processing.

2. An image processing apparatus comprising:
an image acquisition unit for obtaining image data representing an image with gradation values that vary linearly with the amount of light; and
an image correction unit for performing a conversion processing to convert said image data so that gradation values vary linearly with the amount of light, and producing, based on said image data, image quality adjusted data representing an image obtained when an image quality adjustment processing is performed on the data after said conversion processing.

3. An image processing apparatus according to claim 1, wherein: either or both of a processing for constant-multiplying the brightness of an image and a processing for constant-multiplying a chromatic color component by a different constant for each of a plurality of chromatic color components is performed.

4. An image processing apparatus according to claim 1, wherein:
- said image data is data on which a color adjustment processing has been performed including a processing for converting an input value into an output value according a predetermined input/output characteristic, with a gradation value equivalent to the brightness for each color component used as an input value;
- the rate of change of input/output at around median of input values in said input/output characteristic is 1.1 to 1.4; and
- the rate of change of input/output for a predetermined input value is equivalent to flesh color.

5. An image processing apparatus according to claim 1, wherein:
- conversion characteristic data representing the characteristic of said conversion processing is pre-stored on a storage medium; and
- said image correction unit obtains image quality adjusted data representing an image obtained when said image quality adjustment processing was performed after converting said image data based on said conversion characteristic data.

6. An image processing apparatus according to claim 5, wherein: said image correction unit obtains said image quality adjusted data by converting said image data with reference to image quality adjustment characteristic data representing a conversion characteristic that can be obtained by performing a combination of a processing indicated by said conversion characteristic data, said image quality adjustment processing, and the reverse conversion of said conversion processing.

7. An image processing apparatus according to claim 1, wherein:
- said image data includes conversion characteristic data representing the characteristic of said conversion processing; and
- said image correction unit obtains image quality adjusted data representing an image when said image quality adjustment processing was performed after converting said image data based on said conversion characteristic data.

8. An image processing apparatus according to claim 1, wherein said image correction unit produces image quality adjusted data representing an image obtained when said image quality adjustment processing was performed while suppressing incomplete gradation.

9. An image processing apparatus according to claim 8, wherein said image correction unit suppresses incomplete gradation by performing said image quality adjustment processing on image data where a gradation change existed in a gradation range including a maximum value of gradation values, before said image quality adjustment processing, and thereby preventing the gradation from remaining unchanged.

10. An image processing apparatus according to claim 9, wherein said image correction unit identifies, in an image represented by said image data, an area for which either or both of a processing for constant-multiplying said brightness of an image and a processing for constant-multiplying a chromatic color component by a different constant for each of a plurality of chromatic color components, and identifies other area than this area with said gradation range.

11. An image processing apparatus according to claim 9, wherein said image correction unit separates a dark area from a bright area in an image represented by said image data, based on a predetermined criterion.

12. An image processing apparatus according to claim 9, wherein said image correction unit performs either or both of a processing for constant-multiplying the brightness of an image and a processing for constant-multiplying a chromatic color component by a different constant for a plurality of chromatic color components, and also varying a constant used in said constant-multiplication processing, based on the brightness for each area in an image or color balance relationship.

13. A print control apparatus to control a printer comprising:
- an image data acquisition unit for obtaining image data produced by an image capturing device;
- an image correction unit for performing a processing equivalent to the reverse processing of a color adjustment processing performed by said image capturing device to produce said image data, and produces, based on said image data, image quality adjusted data representing an image obtained when an image quality adjustment processing was performed on data after said conversion processing; and
- a printing unit to perform a printing based on said image quality adjusted data.

* * * * *